United States Patent
Panjnani et al.

(10) Patent No.: US 8,663,518 B2
(45) Date of Patent: Mar. 4, 2014

(54) METHODS OF PRODUCING A TITANIUM DIOXIDE PIGMENT AND IMPROVING THE PROCESSABILITY OF TITANIUM DIOXIDE PIGMENT PARTICLES

(75) Inventors: Kamlesh G. Panjnani, Edmond, OK (US); David F. Marshall, Edmond, OK (US); Jeffrey D. Elliott, Oklahoma City, OK (US)

(73) Assignee: Tronox LLC, Oklahoma City, OK (US)

( * ) Notice: Subject to any disclaimer, the term of this patent is extended or adjusted under 35 U.S.C. 154(b) by 81 days.

(21) Appl. No.: 13/337,839

(22) Filed: Dec. 27, 2011

(65) Prior Publication Data

US 2013/0161856 A1   Jun. 27, 2013

(51) Int. Cl.
*B29B 9/08* (2006.01)

(52) U.S. Cl.
USPC ........ 264/117; 23/313 R; 23/313 P; 106/436; 106/447; 423/610

(58) Field of Classification Search
None
See application file for complete search history.

(56) References Cited

U.S. PATENT DOCUMENTS

| | | |
|---|---|---|
| 3,825,388 A | 7/1974 | Hinley et al. |
| 3,899,346 A | 8/1975 | Ferrigno |
| 4,113,660 A | 9/1978 | Abe et al. |
| 4,810,305 A | 3/1989 | Braun et al. |
| 5,035,748 A | 7/1991 | Burow et al. |
| 5,418,198 A | 5/1995 | Connors, Sr. et al. |
| 5,501,732 A * | 3/1996 | Niedenzu et al. ............ 106/447 |
| 5,510,068 A * | 4/1996 | Parmentier .................... 264/117 |
| 5,612,158 A | 3/1997 | Iguchi et al. |
| 5,653,794 A | 8/1997 | Weber et al. |
| 5,837,049 A | 11/1998 | Watson et al. |
| 6,107,390 A | 8/2000 | Maeda et al. |
| 6,149,712 A | 11/2000 | Hall et al. |
| 6,302,926 B1 * | 10/2001 | Anselmann et al. ........ 23/313 R |
| 6,620,234 B1 | 9/2003 | Kostelnik et al. |
| 7,081,234 B1 * | 7/2006 | Qi et al. ..................... 423/592.1 |
| 7,566,497 B2 | 7/2009 | Bohach et al. |
| 7,837,785 B2 | 11/2010 | Friedrich et al. |
| 7,846,480 B2 | 12/2010 | Gilo et al. |
| 7,931,886 B2 | 4/2011 | Botha et al. |
| 2003/0196517 A1 | 10/2003 | Harada et al. |
| 2007/0072783 A1 | 3/2007 | Flynn |
| 2011/0024681 A1 | 2/2011 | Sugiyama et al. |
| 2011/0159422 A1 | 6/2011 | Nakamura et al. |

FOREIGN PATENT DOCUMENTS

JP       8-259290 A       10/1996
WO   WO 2010/075394 A2   7/2010

OTHER PUBLICATIONS

International Search Report and written opinion issued Feb. 25, 2013 in corresponding PCT/US2012/071664, filed Dec. 26, 2012, Tronox LLC.

Delwel, Francois et al., Continuous Granulation of Sodium Triphosphate in a Pan Granulator, Ind. Eng. Chem. Process Des. Dev., 1978, pp. 261-254, American Chemical Society.

Wright, Dr. Scott et al., Process Improvements for Plastic Processors Resulting from a Modified Form of Titanium Dioxide, 67th Annual Technical Conference of the Society of Plastics Engineers, 2009, vol. 3, 2009, pp. 1473-1476, Society of Plastics Engineers.

* cited by examiner

*Primary Examiner* — Mary F Theisen
(74) *Attorney, Agent, or Firm* — McAfee & Taft (57) ABSTRACT

A method of producing a titanium dioxide pigment is provided. Also provided is a method of improving the processability of titanium dioxide particles without adversely affecting the rheological properties of the titanium dioxide particles.

47 Claims, 6 Drawing Sheets

METHODS OF PRODUCING A TITANIUM DIOXIDE PIGMENT AND IMPROVING THE PROCESSABILITY OF TITANIUM DIOXIDE PIGMENT PARTICLES

BACKGROUND OF THE INVENTION

Titanium dioxide ($TiO_2$) is manufactured around the world for use in a variety of applications. For example, titanium dioxide is commonly used as a pigment in polymer compositions, paint formulations, paper products, and other products.

Titanium dioxide pigments are generally produced in powder form with certain properties and performance characteristics (for example, a certain particle size, shape and lattice structure and certain rheological properties when dispersed in polymer compositions). The pigment particles are typically coated with one or more materials to modify or enhance the properties and characteristics of the pigment for particular applications. For example, the pigment particles are often coated with compounds that function to improve the opacity, brightness, durability and rheological properties of the pigment.

Titanium dioxide pigments can be manufactured by either the sulfate process or the chloride process. In some cases, the particular manufacturing method utilized can impact the properties and characteristics of the pigments and the end application associated therewith.

In the sulfate process for manufacturing titanium dioxide, a titanium slag ore, usually an ilmenite, is dissolved in sulfuric acid to form a mixture of sulfates, including titanyl sulfate. Iron is removed from the solution. The titanyl sulfate is then hydrolyzed in solution to yield insoluble, hydrated titanium dioxide. The hydrated titanium dioxide is heated in a calciner to evaporate the water and decompose the sulfuric acid in the solid. The solid is then converted into titanium dioxide seed crystals which can be milled to the desired size.

In the chloride process for manufacturing titanium dioxide, a dry titanium dioxide ore is fed into a chlorinator together with coke and chlorine to make a titanium halide (such as titanium tetrachloride). Streams of gaseous titanium halide (such as titanium tetrachloride) and oxygen are heated and introduced at high flow rates into an elongated vapor phase oxidation reactor conduit. A high temperature (approximately 2000° F. to 2800° F.) oxidation reaction takes place in the reactor conduit whereby particulate solid titanium dioxide and gaseous reaction products are produced. The titanium dioxide and gaseous reaction products are then cooled, and the titanium dioxide particles are recovered.

In a typical titanium dioxide production process, the titanium dioxide is produced in the form of a fine powder, which tends to be very fluffy. The fine particle size and fluffiness of the produced titanium dioxide powder can cause problematic dust to form when the pigment is transported, bagged and unloaded from bags. Additionally, the fine particle size of the titanium dioxide product can result in significant bridging of the pigment particles which can make it difficult to convey the product and prohibit the product from easily flowing through hoppers and other transfer equipment subsequently used to incorporate the titanium dioxide into other products.

In order to reduce the problematic dust and improve the flowability of the pigment, the titanium dioxide powder can be formed into agglomerates. Unfortunately, however, agglomeration of the powder can decrease important performance characteristics of the pigment in end applications thereof. For example, the fine particle size of the titanium dioxide is very beneficial with respect to performance characteristics of the titanium dioxide such as the ability of the titanium dioxide to be dispersed in polymer compositions and the rheological characteristics of the pigment in such compositions. Thus, efforts to reduce the dustiness and improve pigment flow characteristics of the titanium dioxide tend to come at a sacrifice to important performance characteristics of the titanium dioxide.

BRIEF SUMMARY OF THE INVENTION

In a first aspect, the invention provides a method of producing a titanium dioxide pigment. This aspect of the invention comprises the following steps:
 (1) producing titanium dioxide particles; and
 (2) forming the titanium dioxide particles into titanium dioxide agglomerates by a method that includes the following steps:
  (a) feeding the titanium dioxide particles into an agglomerator;
  (b) admixing a hydrophobic, organic treating agent with the titanium dioxide particles by spraying the treating agent on the titanium dioxide particles in the agglomerator; and
  (c) operating the agglomerator to form the titanium dioxide particles into titanium dioxide agglomerates.

In a second aspect, the invention provides a method of improving the processability of titanium dioxide pigment particles without adversely affecting the rheological properties of the titanium dioxide pigment. The inventive method of this aspect of the invention comprises the following steps:
 (a) feeding titanium dioxide particles into an agglomerator;
 (b) admixing a hydrophobic, organic treating agent with the titanium dioxide particles by spraying the treating agent on the titanium dioxide particles in the agglomerator;
 (c) operating the agglomerator to form the titanium dioxide particles into titanium dioxide agglomerates; and
 (d) transferring the titanium dioxide agglomerates out of the agglomerator.

The titanium dioxide pigment agglomerates produced in accordance with the inventive methods are suitable for use in a variety of applications. The titanium dioxide agglomerates are relatively free-flowing and low dusting yet also have good rheological properties and other performance characteristics. In fact, the rheological properties of the pigment particles can be enhanced by the inventive methods. The titanium dioxide pigment agglomerates are particularly suitable for use in polymer compositions including, but not limited to polyolefin, polyvinyl chloride (PVC), and polycarbonate (engineering plastics) compositions.

BRIEF DESCRIPTION OF THE DRAWINGS

FIG. 6 illustrates an alternative configuration and alternative location of the spray nozzle used to spray the treating agent on the titanium dioxide particles in the agglomerator.

DETAILED DESCRIPTION OF THE INVENTION

In a first aspect, the invention is a method of producing a titanium dioxide pigment. In a second aspect, the invention is a method of improving the processability of titanium dioxide pigment particles without adversely affecting the rheological properties of the titanium dioxide pigment.

Figure 1:
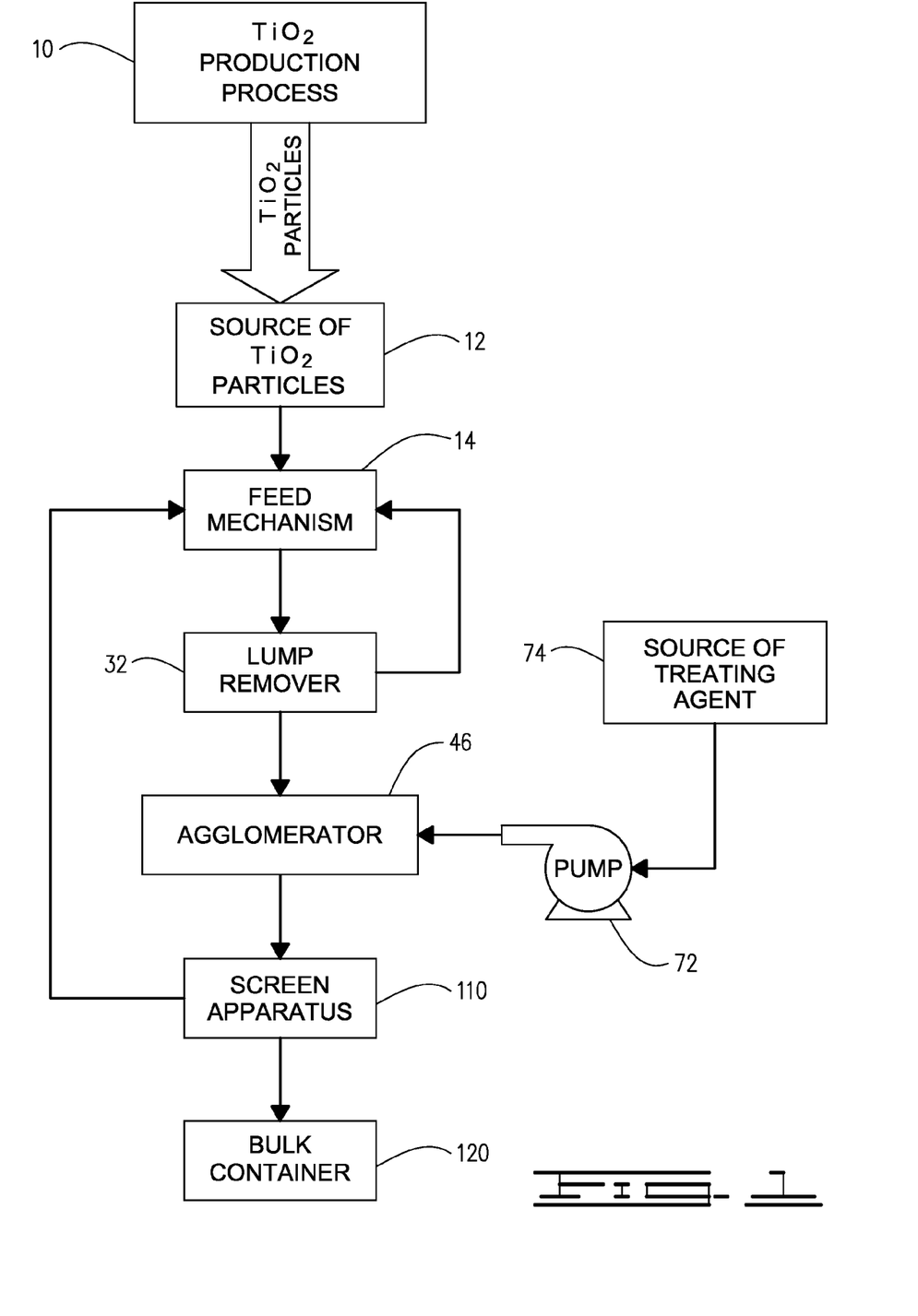
FIG. 1 is a flow diagram illustrating the first aspect of the invention, namely, the inventive method of producing a titanium dioxide pigment.
Figure 3:
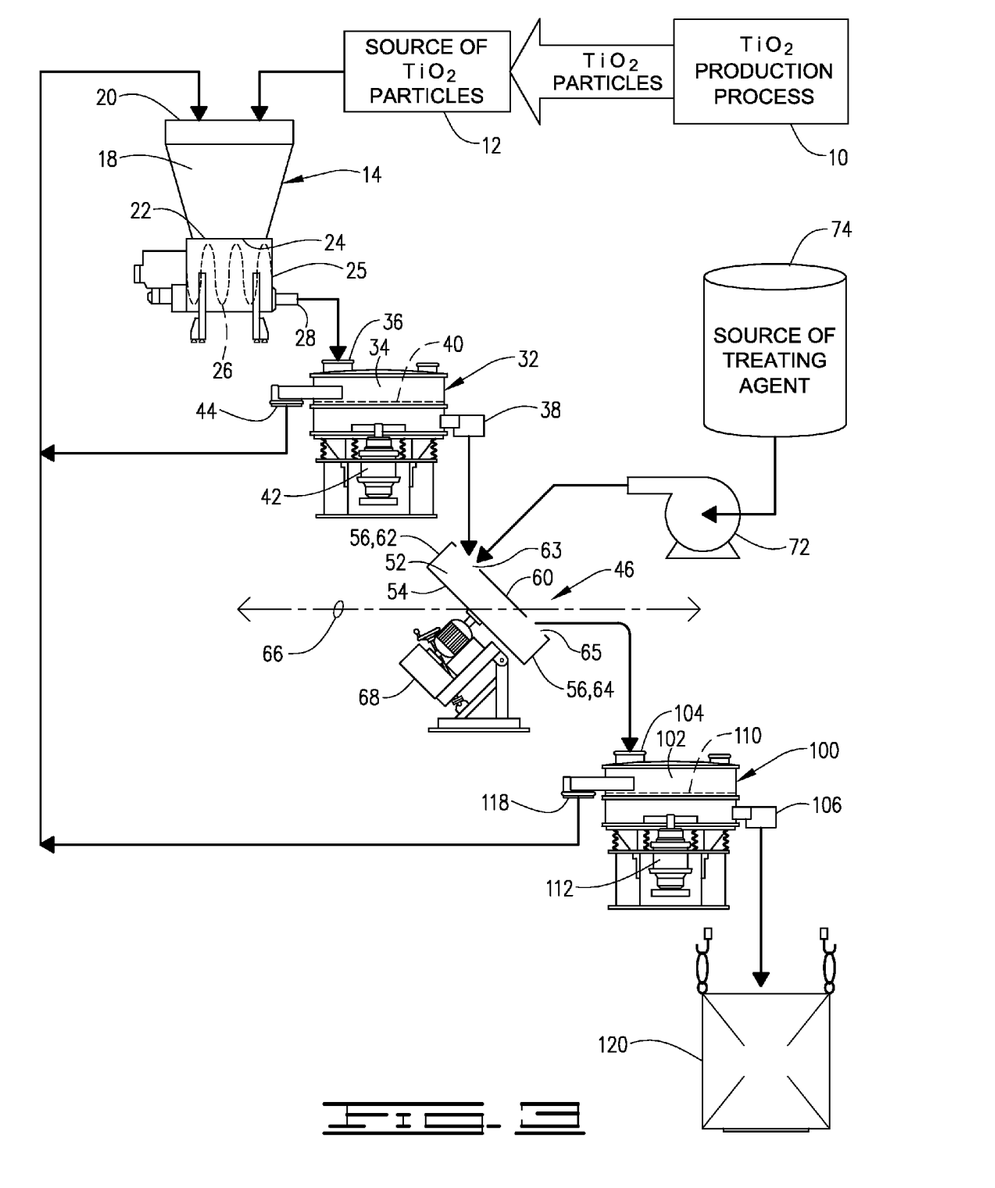
FIG. 3 is a schematic flow diagram illustrating the first aspect of the invention and examples of equipment used therein.

Referring now to the drawings and specifically to FIGS. 1 and 3, the first aspect of the invention will be described. The inventive method of producing a titanium dioxide pigment can be carried out on a batch or a continuous basis. As described in this detailed description, the inventive process is carried out on a continuous basis. The titanium dioxide pigment produced by the inventive method has improved processability. As used herein and in the appended claims, "improved processability" means reduced dusting and improved flow properties during processing.

In accordance with a first step, titanium dioxide particles are produced by a titanium dioxide production process 10. The exact nature of the titanium dioxide production process 10 is not critical. Processes for producing titanium dioxide particles are well known in the art. For example, the titanium dioxide production process can be a chloride process for producing titanium dioxide or a sulfate process for producing titanium dioxide. In this aspect of the invention, the titanium dioxide production process 10 is a source 12 of titanium dioxide particles.

The titanium dioxide particles are then formed into titanium dioxide agglomerates in accordance with the method described below. The titanium dioxide particles are transferred from the titanium dioxide production process 10 (the source 12 of titanium dioxide particles) to a feed mechanism 14. For example, if the titanium dioxide production process is a chloride process, the particles 10 can be continuously conveyed from a cooler used to cool the particles following a micronization step to the feed mechanism 14.

The feed mechanism 14 operates to continuously feed the titanium dioxide particles downstream at a controlled rate. The particular feed rate depends on the scale of the overall method including the rate at which the titanium dioxide particles are fed by the source 12 of titanium dioxide particles (in this aspect, the titanium dioxide production process 10), and the capacity of the agglomerator (described below).

As shown by FIG. 3, the feed mechanism 14 is a screw feeder. The screw feeder 14 includes a hopper 18 having an inlet 20 for receiving titanium dioxide particles from the source 12 of titanium dioxide particles (in this aspect, the titanium dioxide production process 10) and an outlet 22. The outlet 22 of the hopper 18 is connected to the inlet 24 of a housing 25 containing a rotating auger 26. The housing 25 containing the rotating auger 26 also includes an outlet 28. The rotation speed of the auger 26 controls the rate at which the titanium dioxide particles are conducted through the outlet 28. Examples of other mechanisms that can be utilized as the feed mechanism 14 include rotary or star valve feeders, pneumatic feeders, and belt or bucket conveyors.

The titanium dioxide particles are continuously fed from the outlet 28 of the auger housing 25 of the screw feeder 14 to a lump remover 32 which processes the particles to remove lumps therefrom. Lumps of the titanium dioxide particles can be formed, for example, due to compaction of the particles in large bulk containers or bags.

As shown by FIG. 3, the lump remover 32 includes a housing 34 having an inlet 36 for receiving the titanium dioxide particles, and an outlet 38. The housing 34 is divided by an upstream vibrating screen 40 which is vibrated by a motor 42. The titanium dioxide particles are conveyed from the outlet 28 of the auger housing 25 into the inlet 36 of the housing 34 of the lump remover 32 and onto the vibrating screen 40. The vibrating screen 40 is continuously vibrated by the motor 42 to screen any lumps of the titanium dioxide particles sufficiently to allow the particles to pass through the screen. Any lumps of the titanium dioxide particles that are not sufficiently screened to allow the particles to pass through the vibrating screen 40 are recirculated through a recirculation outlet 44 of the housing 34 of the lump remover 32 back to the inlet 20 of the screw feeder 14. The screen 40 preferably has a U.S. mesh size in the range of from about 7 to about 16. More preferably, the screen 40 has a U.S. mesh size in the range of from about 8 to about 12.

The titanium dioxide particles are continuously fed from the outlet 38 of the housing 34 of the lump remover 32 to an agglomerator 46. Prior to being fed into the agglomerator 46, the titanium dioxide particles are in the form of a powder having a primary particle size in the range of from about 0.1 to about 0.5 microns. Preferably, the titanium dioxide particles are in the form of a powder having a primary particle size in the range of from about 0.15 microns to about 0.3 microns.

Lumps of the titanium dioxide particles can interfere with the agglomeration step of the inventive process. However, the lump removal step and lump remover 32 are optional. For example, if the titanium dioxide particles do not have any problematic lumps or the potential therefor as they come out of the screw feeder, the lump removal step and lump remover 32 can be eliminated.

Figure 5:
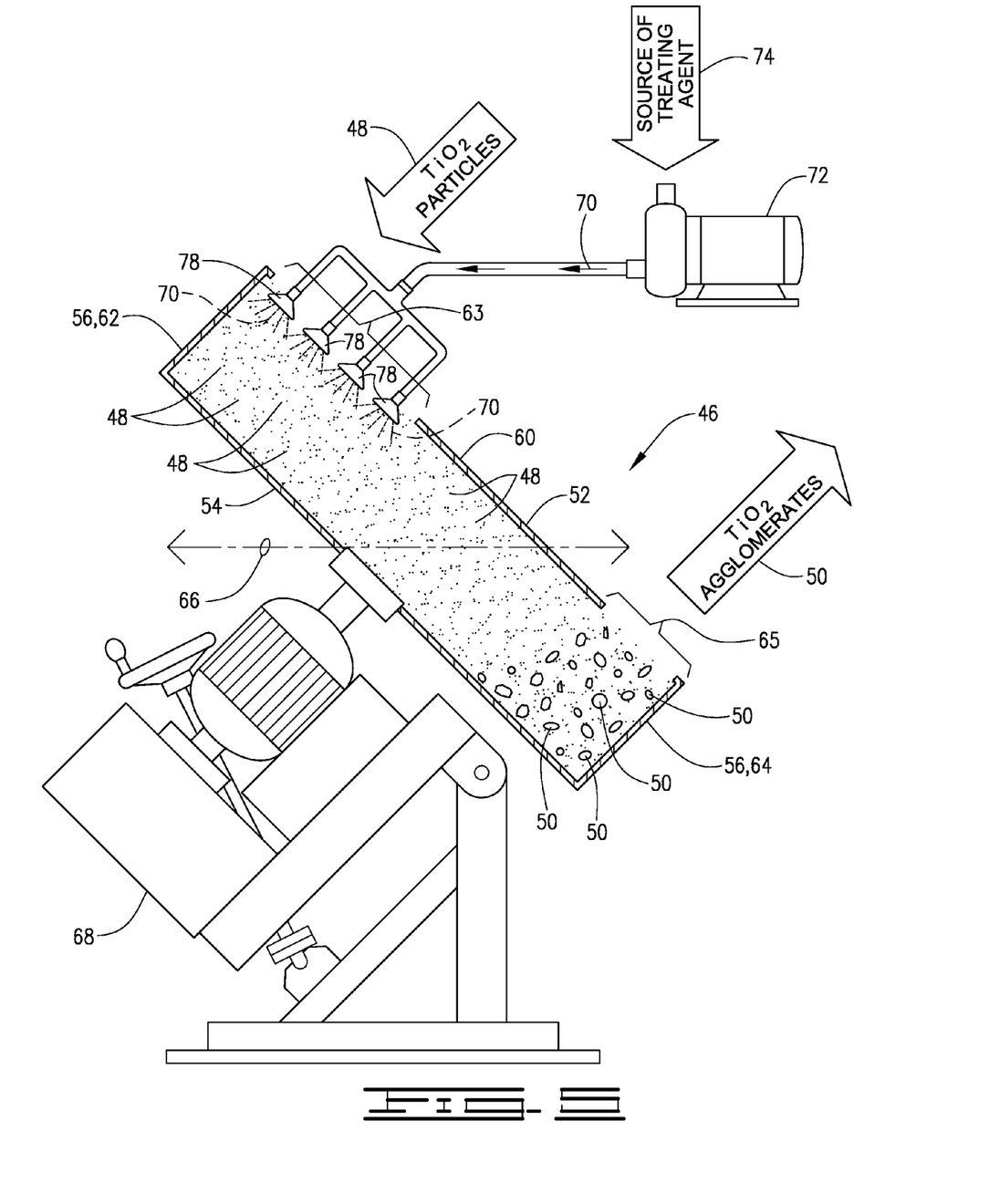
FIG. 5 illustrates the inventive methods, including the agglomerator and steps of admixing the hydrophobic, organic treating agent with the titanium dioxide particles and operating the agglomerator to form the titanium dioxide particles into titanium dioxide agglomerates.

As best shown by FIG. 5, the agglomerator 46 forms the titanium dioxide particles (as designated by the reference numeral 48) into titanium dioxide agglomerates (as designated by the reference numeral 50). As used herein and in the appended claims, "titanium dioxide agglomerates" means a plurality of titanium dioxide particles bound together into a ball, cluster or other mass. For example, the titanium dioxide agglomerates 50 can be in the form of pellets or prills. The agglomerator 46 is preferably a rotary mixer.

Figure 4:
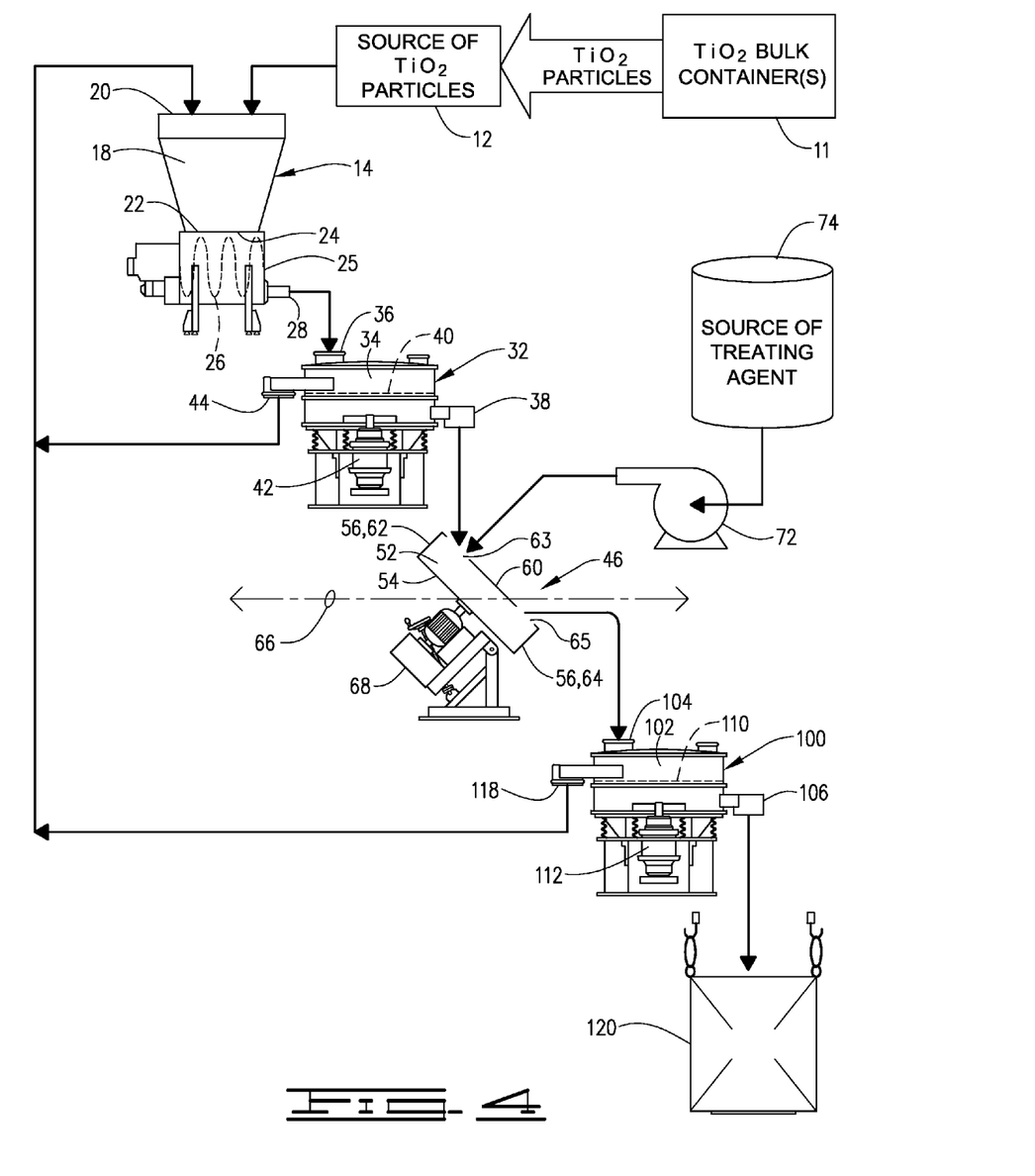
FIG. 4 is a schematic flow diagram illustrating the second aspect of the invention and examples of equipment used therein.

As shown in detail by FIGS. 3-5, the agglomerator 46 is a pan pelletizer. The pan pelletizer 46 includes a rotating pan 52 having a bottom 54, circumferential wall 56 perpendicularly extending from the bottom, and an open top 60 opposing the bottom. As shown by FIG. 3, the circumferential wall has an upper end 62 and a lower end 64. Titanium dioxide particles 48 are transferred from the outlet 38 of the housing 34 of the lump remover 32 into the pan pelletizer 46 through the open top 60 thereof (for example, through a portion 63 of the open top 60 adjacent to the upper end 62 of the circumferential wall 56). Similarly, the agglomerates 50 formed in the pan pelletizer 46 are transferred out of the pan pelletizer 46 through the open top 60 thereof (for example, through a portion 65 of the open top 60 adjacent to the lower end 64 of the circumferential wall 56).

The rotating pan 52 is downwardly inclined at an angle with respect to the horizontal plane. As used herein and in the appended claims, "downwardly inclined at an angle with respect to the horizontal plane" means downwardly inclined at an angle with respect to the horizontal plane of the room in which the pan pelletizer 46 is located. As shown by FIGS. 3-5, the horizontal plane is designated by the reference number 66. The angle of inclination of the downwardly inclined rotating pan 52 can vary.

A motor 68 rotates the rotating pan 52 in either a clockwise or a counterclockwise direction. Preferably, the rotating pan 52 is rotated in a clockwise direction. As discussed below, the speed at which the rotating pan 52 is rotated can vary.

A hydrophobic, organic treating agent 70 is admixed with the titanium dioxide particles 48 by spraying the treating agent on the titanium dioxide particles in the agglomerator 46. As used herein and in the appended claims, spraying the treating agent on the titanium dioxide particles "in the agglomerator" means that the treating agent is sprayed onto the titanium dioxide particles within the actual confines of the agglomerator (for example, within the confines of the rotating pan 52) or as the particles are falling into or otherwise being transferred into the agglomerator.

The treating agent 70 is in liquid form and pumped by a pump 72 from a source 74 of the treating agent through a series of spray nozzles 78 positioned in the rotating pan 52 through the open top 60 adjacent to the upper end 62 of the circumferential wall 56. The treating agent 70 is continuously sprayed on the titanium dioxide particles 48 as the particles are transferred into the rotating pan 52. The agglomerator 46 is operated to form the titanium dioxide particles 48 into titanium dioxide agglomerates 50.

The manner in which the treating agent 70 is sprayed onto the titanium dioxide particles 48 in the agglomerator 46 can vary. For example, as shown by FIG. 6, in an alternative embodiment, a single spray nozzle 78 is utilized. Also, as shown by FIG. 6, the spray nozzle or nozzles can be positioned through the open top 60 of the rotating pan 52 closer to or even adjacent to the lower end 64 of the circumferential wall 56.

Examples of compounds suitable for use as the hydrophobic, organic treating agent 70 used in association with the invention include silanes, polysiloxanes, saturated fatty acid salts, unsaturated fatty acid salts, phosphonic acids and derivatives thereof, and combinations thereof.

Silanes suitable for use as the treating agent 70 preferably have the formula:

$$R_n\text{—Si—}X_{4-n} \quad (1)$$

where R is an alkyl group (including a functionalized alkyl group), an aryl group (including a functionalized aryl group), or an alkylaryl group (including a functionalized alkylaryl group);

X is a halogen, hydroxy or alkoxy group; and n is from 1 to 3.

Representative silanes having the above formula include alkyl trichlorosilanes, dialkyl dichlorosilanes, trialkyl chlorosilanes, alkyltrimethoxysilanes, dialkyl dimethoxysilanes, trialkylmethoxysilanes, alkyltriethoxysilanes, dialkyl diethoxysilanes, and trialkylethoxysilanes, where the alkyl group can range from $C_1$ to $C_{18}$ or higher (methyl, ethyl, propyl, isopropyl, butyl, isobutyl, ter-butyl, pentyl, hexyl, octyl, decyl, dodecyl, etc.) and combinations thereof.

Additional representative silanes having the above formula include phenyltri-chlorosilane, diphenyldichlorosilane, triphenylchlorosilane, phenyltrimethoxysilane, diphenyldimethoxysilane, triphenyltrimethoxysilane, alkylphenyldichlorosilanes, dialkylphenylchlorosilanes, alkyldiphenylchlorosilanes, alkylphenyldimethoxysilanes, dialkylphenylchlorosilanes, and alkyldiphenylmethoxysilanes, where the alkyl group can range from $C_1$ to $C_{18}$ or higher, and combinations thereof.

Preferred silanes for use as the treating agent 70 include hexyltrichlorosilane, hexylmethyldichlorosilane, octyltrichlorosilane, octylmethyldichlorosilane, propyltrimethoxy-silane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octyl-methyldiethoxysilane, aminopropyltrimethoxysilane, aminopropyltriethoxysilane, and mixtures thereof. For example, n-octyl triethoxysilane is very suitable for use as the treating agent 70.

Polysiloxanes suitable for use as the treating agent 70 preferably have the formula:

$$X\text{—}(R_1R_2SiO)_n\text{—}Y \quad (2)$$

where $R_1$ and $R_2$ are a hydrogen, an alkyl group or an aryl group;

X is hydrogen or a hydroxyl group, alkoxy group, alkyl group (including functionalized alkyl groups), or aryl group (including functionalized aryl groups);

Y is a hydrogen or an alkyl group (including functionalized alkyl groups), or an aryl group (including functionalized aryl groups); and n is from 1 to 2000.

Representative polysiloxanes having the above formula include polyhydrogen-methylsiloxane, polydimethylsiloxane, polyalkylsiloxanes where the alkyl group can range from $C_1$ to $C_{18}$ or higher, polyphenylmethylsiloxane, polydiphenylsiloxane, and mixtures thereof.

Preferred polysiloxanes for use as the treating agent 70 include polyhydrogen-methylsiloxane, polydimethylsiloxane, polyhexylmethylsiloxane, polyoctylmethylsiloxane, or a combination thereof. For example, poly(hydrogenmethylsiloxane), poly(dimethylsiloxane), and mixtures thereof are very suitable for use as the treating agent 70.

Saturated fatty acid salts suitable for use as the treating agent 70 preferably have the formula:

$$M^+\text{—OOC—}(C_nH_{2+1}) \quad (3)$$

where M is an alkali metal, alkaline earth metal, or transition metal; and n ranges from 11-17.

Representative saturated fatty acid salts having the above formula include sodium laurate, sodium myristate, sodium palmitate, sodium stearate, potassium laurate, potassium myristate, potassium palmitate, potassium stearate, calcium laurate, calcium myristate, calcium palmitate, calcium stearate, zinc laurate, zinc myristate, zinc palmitate, zinc stearate, magnesium laurate, magnesium myristate, magnesium palmitate, and magnesium stearate.

Preferred saturated fatty acid salts for use as the treating agent 70 include calcium stearate, zinc stearate, magnesium stearate or a combination thereof.

Unsaturated fatty acid salts suitable for use as the treating agent 70 preferably have the formula:

$$M^+\text{—OOC—}(C_nH_{2n-x}) \quad (4)$$

where M is an alkali metal, alkaline earth metal or transition metal;

n ranges from 11-17; and x ranges from 1 to 13.

Representative unsaturated fatty acid salts having the above formula include, sodium oleate, sodium linoleate, sodium myristoleate, sodium palmitoleate, potassium oleate, potassium linoleate, potassium myristoleate, potassium palmitoleate, calcium oleate, calcium linoleate, calcium myristoleate, calcium palmitoleate, zinc oleate, zinc linoleate, zinc myristoleate, and zinc palmitoleate.

Preferred unsaturated fatty acid salts for use as the treating agent 70 include one or more of the oleates and/or linoleates of sodium, potassium, calcium and zinc.

Phosphonic acids and derivatives thereof suitable for use as the treating agent 70 preferably have the formula:

$$R_1\text{---}PO(OR_2)(OR_3) \qquad (5)$$

where $R_1$ is an alkyl, aryl, or alkylaryl group; and $R_2$ and $R_3$ are each a hydrogen, an alkyl group, an aryl group or an alkylaryl group.

Representative phosphonic acids and derivatives thereof that have the above formula include n-hexylphosphonic acid, n-octylphosphonic acid, 2-ethylhexyl phosphonic acid, 2-methyloctyl phosphonic acid, n-decyl phosphonic acid, n-dodecylphosphonic acid, n-tetradecyl-phosphonic acid, n-hexadecylphosphonic acid, n-octadecylphosphonic acid, benzylphosphonic acid, and methyl esters, ethyl esters, dimethyl esters, diethyl esters, and methyl ethyl esters of all of the above phosphonic acids.

Preferred phosphonic acids and derivatives thereof for use as the treating agent include n-hexylphosphonic acid, n-octylphosphonic acid, 2-ethylhexylphosphonic acid, 2-methyloctyl-phosphonic acid, or a combination thereof.

The organic treating agent 70 is preferably selected from silanes, polysiloxanes, and mixtures thereof. More preferably, the organic treating agent 70 is selected from n-octyl triethoxysilane, poly(hydrogenmethylsiloxane), poly(dimethylsiloxane), and mixtures thereof. Most preferably, the organic treating agent 70 is poly(hydrogenmethylsiloxane).

The organic treating agent 70 is preferably sprayed on the titanium dioxide particles 48 in the agglomerator 46 in a manner that results in a substantially uniform distribution of the treating agent on the particles. For example, if the treating agent sprayed from the spray nozzles 78 is too coarse, an uneven distribution of the treating agent on the particles may result. Over-wetting one portion of the particles 48 with respect to another portion of the particles can cause the size of some agglomerates 50 to be too large. Accordingly, in order to avoid these types of processing problems, the treating agent is preferably sprayed on the titanium dioxide particles in the form of a spray having a mean droplet size of no greater than 100 microns, more preferably no greater than 50 microns. Most preferably, the treating agent is sprayed on the titanium dioxide particles in the form of a spray having a mean droplet size of no greater than 30 microns. The treating agent is preferably admixed with the titanium dioxide particles in the agglomerator 46 in an amount in the range of from about 0.1% by weight to about 2.0% by weight, more preferably in the range of from about 0.4% by weight to about 0.8% by weight, based on the weight of the titanium dioxide particles.

The size of the titanium dioxide agglomerates 50 formed by the agglomeration step of the inventive process is dependent upon the retention time of the titanium dioxide particles in the rotating pan 52, the speed at which the rotating pan is rotated and the angle at which the rotating pan is downwardly inclined with respect to the horizontal plane. The exact retention time, rotation speed and angle utilized will vary depending upon the scale of the agglomerator 46. Generally, the retention time of the titanium dioxide particles 48 in the rotating pan 52 is in the range of from about 0.5 minutes to about 15 minutes, more typically in the range of from about 1 minute to about 5 minutes. The rotating pan 52 is generally rotated at a rate in the range of from about 2 rpm to about 50 rpm, typically in the range of from about 8 rpm to about 20 rpm. Finally, the rotating pan 52 is generally downwardly inclined at an angle with respect to the horizontal plane in the range of from about 40 degrees to about 60 degrees, more typically in the range of from about 45 degrees to about 55 degrees.

The titanium dioxide agglomerates 50 are transferred out of the agglomerator 46 to another location. As shown by the drawings, the titanium dioxide agglomerates 50 are transferred out of the agglomerator 46 to a screen apparatus 100 where the agglomerates are screened to assure that they have a uniform size. Screening the titanium dioxide agglomerates 50 and use of the screen apparatus 100 at this stage of the process is optional.

As shown by FIG. 3, the screen apparatus 100 includes a housing 102 having an inlet 104 for receiving the titanium dioxide agglomerates 50 and an outlet 106. The housing 102 is divided by a downstream vibrating screen 110 which is vibrated by a motor 112. The titanium dioxide agglomerates 50 are conveyed out of the open top 60 of the rotating pan 52 (for example, through a portion 65 of the open top 60 adjacent to the lower end 64 of the circumferential wall 56) into the inlet 104 of the housing 102 of the screen apparatus 100 and on to the downstream vibrating screen 110. The downstream vibrating screen 110 is continuously vibrated by the motor 112 to sufficiently screen the agglomerates 50 to allow the agglomerates to pass through the screen. Any titanium dioxide agglomerates 50 that are too large to pass through the downstream vibrating screen 110 are recirculated through an outlet 118 in the housing 102 of the screen apparatus 100 to the inlet 20 of the hopper 18 of the screw feeder 14.

The downstream vibrating screen 110 preferably has a U.S. mesh size in the range of from about 2 to about 10, more preferably in the range of from about 4 to about 8. The titanium dioxide agglomerates 50 preferably have an average agglomerate size in the range of from about 200 microns to about 800 microns, more preferably in the range of from about 300 microns to about 600 microns. The bulk density of the titanium dioxide agglomerates 50 is preferably in the range of from about 0.8 $g/cm^3$ to about 1.4 $g/cm^3$, more preferably in the range of from about 0.9 $g/cm^3$ to about 1.2 $g/cm^3$.

As shown by FIG. 3, the titanium dioxide agglomerates 50 are transferred from outlet 106 of the housing 102 of the screen apparatus 100 into a bulk container (for example, a bag) 120. The titanium dioxide agglomerates 50 can then be stored and/or shipped for use in polymer compositions.

Figure 2:
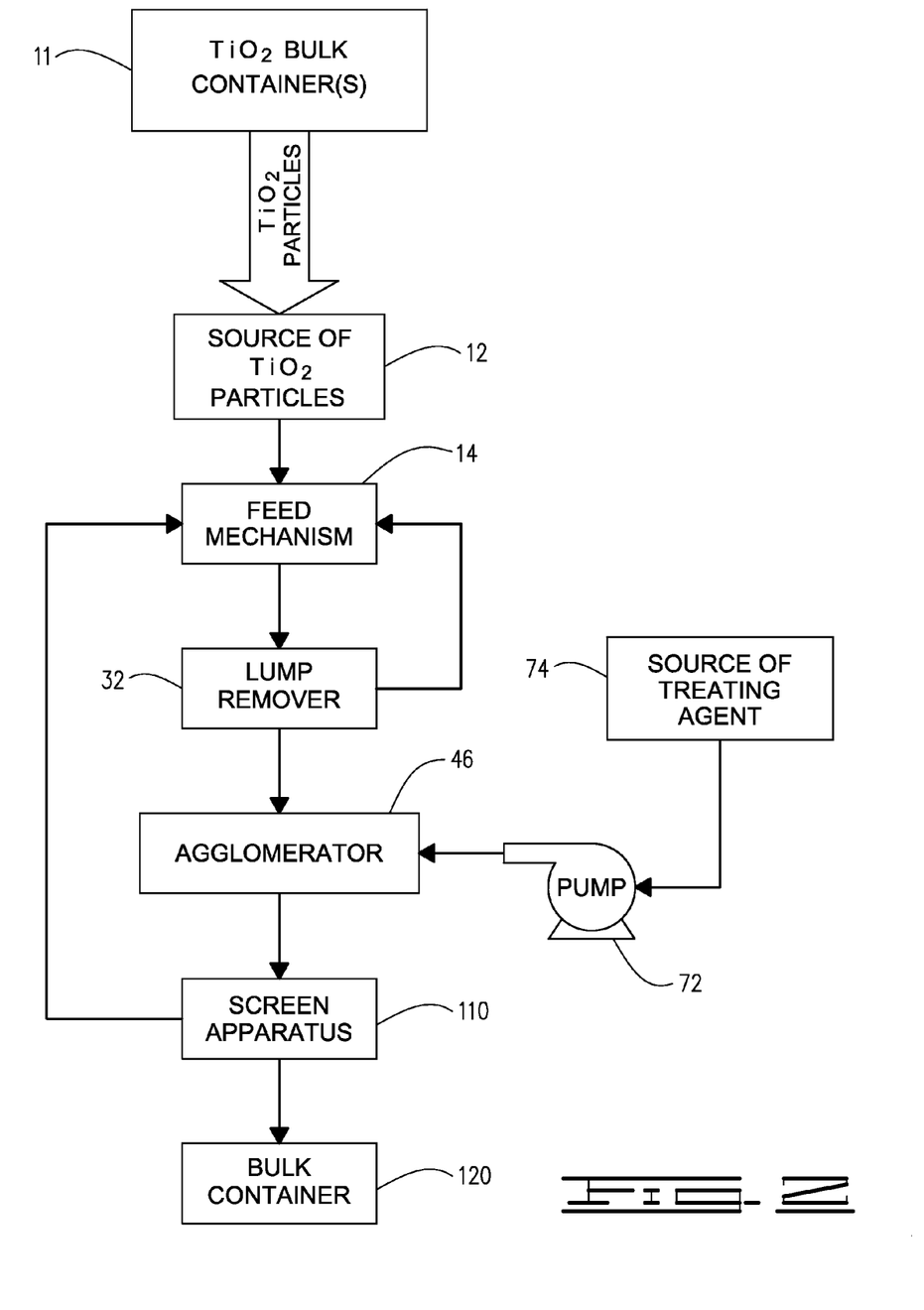
FIG. 2 is a flow diagram illustrating the second aspect of the invention, namely, the inventive method of improving the processability of titanium dioxide pigment particles without adversely affecting the rheological properties of the titanium dioxide pigment.

Referring now to the drawings and specifically to FIGS. 2 and 4, the second aspect of the invention will be described. The inventive method of improving the processability of titanium dioxide pigment particles without adversely affecting the rheological properties of the titanium dioxide pigment can be carried on a batch or a continuous basis. As described in this detailed description, the inventive process is carried out on a continuous basis. As used herein and in the appended claims, "improving the processability" means reducing dusting and improving flow properties during processing. As used herein and in the appended claims, "without affecting the rheological properties of the titanium dioxide particles" means that the rheological properties of the titanium dioxide particles after the process is carried out are the same or better than they would be if the process had not been carried out.

The inventive method of the second aspect of the invention includes the method of forming titanium dioxide particles into titanium dioxide agglomerates 50 described above in connection with the first aspect of the invention. The method of this aspect of the invention does not necessarily include the step of producing titanium dioxide particles. In this aspect of the invention, the source 12 of titanium dioxide particles can be, for example, one or more bulk containers 11 (for example, bags) of titanium dioxide particles that have already been produced. For example, the titanium dioxide particles are transferred from the bulk bag(s) of titanium dioxide particles to the feed mechanism 14. The titanium dioxide particles can be produced by either the chloride process or the sulfate process.

The titanium dioxide agglomerates formed by the inventive methods (the method of each aspect of the invention) are very suitable for use in polymer compositions. As used herein and in the appended claims, a "polymer composition" means a composition containing a polymer as one of the components thereof. For example, the polymer composition can be a polymer masterbatch composition suitable for use in forming various polymer and plastic products. Examples of polymer compositions in which the titanium dioxide particles of the inventive process can be used include polyolefin polymer compositions, polyvinyl chloride polymer compositions and polycarbonate (engineering plastics) compositions.

The titanium dioxide agglomerates formed in accordance with the inventive methods are relatively free-flowing and low dusting yet have good rheological properties and other performance characteristics. For example, the titanium dioxide agglomerates can be conveyed, bagged and unloaded from bags without problematic dust formation. The titanium dioxide agglomerates do not tend to bridge and are therefore relatively easy to convey. The agglomerates easily flow in association with transfer and other equipment subsequently used to incorporate the titanium dioxide pigment into other products.

Despite the above processing and handling advantages, the performance characteristics of the titanium dioxide pigment formed in accordance with the inventive methods in end applications are not compromised. The agglomerates are fragile enough to allow them to be readily mixed into and/or with compositions associated with other applications.

The titanium dioxide agglomerates formed in accordance with the inventive methods have excellent rheological properties in polymer compositions. For example, when admixed into polymer masterbatch compositions, the titanium dioxide agglomerates can result in lower torque values, high melt flow retention values, low screen pack pressures, and no increase in screen pack residue as compared to the same titanium dioxide particles that have not been agglomerated in accordance with the inventive methods. In polyolefin applications, the titanium dioxide agglomerates produced in accordance with the inventive methods show considerable improvement in lacing resistance over typical micronized titanium dioxide pigment (titanium dioxide pigment that has not been agglomerated in accordance with the inventive methods). In polyvinyl chloride applications, the titanium dioxide agglomerates produced in accordance with the inventive methods lead to improved processability compared typical micronized titanium dioxide pigment (titanium dioxide pigment that has not been agglomerated in accordance with the inventive methods).

EXAMPLES

The present invention is exemplified by the following examples, which are given by way of example only and should not be taken as limiting the present invention in any way.

The following test methods were utilized in connection with the examples:

Pour Density

The pour density of the samples was measured by the method described in ASTM B329. Each sample was poured through a series of glass riffle plates into a tared one cubic inch cube. The sample was then allowed to overflow the cube, filling it completely. The straight edge of a spatula was then drawn carefully across the top of the cube to remove the excess material, leaving the remaining level with the edges of the cube. The cube and sample were then weighed. The weight of the empty cube was subtracted from the weight of the cube and sample. This provided the weight of the sample in a known (one cubic inch) volume and hence the pour density.

Tap Density

The tap density of the sample was measured by the method described in ASTM B527-93. Each sample was poured through a funnel into a tared graduate cylinder. The sample was allowed to overflow the cylinder, filling it completely. The straight edge of a spatula was drawn carefully across the top of the cylinder to remove the excess material, leaving the remaining level with the edges of the cylinder. The cylinder and sample were then weighed. The cylinder and sample were placed into a tapping device and cycled through the tapping process. The weight of the empty cylinder was subtracted from the weight of the cylinder and sample. This provided the weight of the settled sample in a known volume and hence the tap density of the sample.

Particle Size by Sieve Analysis

In analyzing particle size by sieve analysis, approximately 7 grams of the sample were poured onto the top of a nestled set of 3" sieves having a U.S. mesh ranging from 8 to 325. The initial sample weight was recorded and the sieves were placed into a Gilson Performer III model SS3 sieve shaker. The vibration was set to 1, and the time was set to 15 minutes. The weight of the sample retained in each sieve was measured. The % of the sample retained in each sieve was calculated by dividing the weight of the sample retained in that sieve by the starting weight of the sample. Using statistical analysis of the particle size distribution data, the median was reported as the average particle size $d_{50}$ of the pigment agglomerates.

Dust Test

In carrying out a dust test, 25 grams of the sample were placed in a 2.5" inner diameter fritted glass funnel. The funnel was attached to the bottom of a 24" tall, 2.5" outer diameter tube. The sample was fluidized using an air vibrator. Once the sample was uniformly fluidized, a vacuum was applied at the top of the 24" tube to collect dust generated due to the fluidization process. The test was performed for 5 minutes. After the 5 minute test period, the vacuum was removed and the fritted funnel along with the sample was reweighed to determine the weight of the portion of the sample that was lost. The percent weight loss represented the dusting level of the sample. A lower dusting level indicated that the sample was easier to handle.

Pigment Flow Test

The pigment flow tests were performed according to the procedure described in ASTM D-1895. A 100 cc sample of the titanium dioxide pigment being tested was placed in a funnel with dimensions as outlined in the ASTM procedure. The titanium dioxide sample was then allowed to flow through the orifice at the bottom of the funnel. The time for 100 cc of the pigment to flow through the orifices was measured using a stop watch. The time to flow through the funnel was recorded and reflective of the pigment flowability. A shorter flow time indicated better pigment flowability.

Attrition Testing

In testing the attrition of the samples, 50 grams of the agglomerated titanium dioxide sample was placed in a plastic zip lock bag. The zip lock bag along with the sample was then placed on a flat metal base. A load of 5000 grams was placed on top of the bag. The sample along with the load was subjected to vibration using an air vibrator for one hour. The dust test and sieve analysis were performed on the sample before and after the attrition test. The change in the dusting level was used to measure the impact of attrition on the agglomerated pigment sample. No significant increase in dusting level after attrition indicated better sample handling characteristics.

High Load Testing

In carrying out the high load tests, 109.5 grams of the titanium dioxide sample was dry blended with 36.5 grams of low density polyethylene. The blended mixture was loaded into a Brabender Intelli-Torque Plasti-Corder torque rheometer (a "Brabender Rheometer") fitted with Type-6 Cam mixing blades. The mixture was fused at 100° C. with a mixing speed of 100 rpm for 9 minutes to yield a 75% pigment concentrate. The high load equilibrium torque was determined using a software program that operates the rheometer and measures the torque required to mix and fuse the 75% pigment concentrate. A lower high-load torque indicated easier fusion of the pigment concentrate.

Melt Flow Index Testing

The melt flow index tests were performed according to the method outlined in ASTM D-1238-10. The 75% pigment concentrate made in the high load testing procedure described above was granulated using a Nelmor Model G810P1 lab granulator. In these tests, 7.5 grams of pigment concentrate were introduced into a Tinius Olsen MP600 melt flow index instrument fitted with an orifice having a 2.0955 mm opening. The testing temperature was set to 190° C. and a 2.16 Kg load cell was used to test the melt flow of the sample. The time required for the sample to flow through the melt flow index instrument was used to calculate the melt flow index of the sample. A higher melt flow index indicated better flowability of the pigment concentrate.

Screen Pack Testing

The screen pack tests were performed using a Brabender Rheometer fitted with a ¾" single screw extruder with a 25:1 L/D and a 3:1 compression ratio. The extruder was preheated to 170° C., 177° C., 185° C., and 193° C. in zone 1, zone 2, zone 3, and the die of the extruder, respectively. A preweighed set of screens having U.S. mesh values of 40, 500 and 40, respectively, was placed between the extruder and the die. The extruder speed was set to 100 rpm. In these tests, 100 grams of the 75% pigment concentrate made in the high load testing procedure followed by granulation using a Nelmor Model G810P1 lab granulator was fed into the extruder followed by a three step purge with 200 grams of low density polyethylene, 100 grams of polystyrene and 200 grams of low density polyethylene. Once the extruder was completely purged, the set of screens with the residue was removed and ashed in a muffle furnace at 700° C. for 10 minutes. The screen pack residue was calculated on a dry pigment basis and reported in parts per million. The screen pack pressure was measured by the software that operates the extruder and measures the pressure at the screens. A lower screen pack pressure and residue indicated good pigment dispersion.

Example I

Impact of Agglomeration on Reduction in Dusting Level and Flow Properties

In this example, the following titanium dioxide pigments were utilized:

(1) an alumina-based hydrophilic titanium dioxide manufactured by Tronox LLC in accordance with the chloride process and marketed as TRONOX® CR-834;

(2) a silica and alumina based hydrophilic, titanium dioxide manufactured by Tronox LLC in accordance with the chloride process and marketed as TRONOX® CR-826; and (3) an alumina based hydrophobic titanium dioxide manufactured by crenox GmbH in accordance with the sulfate process and marketed as Crenox™ R-FK-2.

The hydrophobic, organic treating agent utilized in the tests was poly(hydrogenmethylsiloxane) ("PHMS"). When used, the treating agent was utilized in an amount of 0.6% by weight, based on the weight of the titanium dioxide pigment particles.

In each test, the corresponding pigment and PHMS were first admixed together by spraying the PHMS onto the pigment. The samples were then transferred to a one quart container and rolled on a Paul O. Abbe Model #306024 roller (an "Abbe Roller") at 100 rpm for 1 hour. The agglomerated pigment samples were then placed in an oven at 120° C. for 1 hour.

The resulting samples were then tested for dust and flow properties according to the procedures described above. The samples were also subjected to attrition tests and then retested for dusting analysis as set forth above. The results of the tests are set forth in Table 1 below:

TABLE 1

| Sample | Organic Treating Agent Sprayed | Amount of Organic Treating Agent* | Dusting (% loss) | Dusting post attrition (% loss) | Flow properties |
|---|---|---|---|---|---|
| TRONOX® CR-834 (as is) | None | None | 6.84 | — | Significant bridging (no flow) |
| TRONOX® CR-834 (agglomerated) | PHMS | 0.6% | 0.16 | 0.52 | 6.9 seconds |
| TRONOX® CR-826 (as is) | None | None | 7.44 | — | Significant bridging (no flow) |

TABLE 1-continued

| Sample | Organic Treating Agent Sprayed | Amount of Organic Treating Agent* | Dusting (% loss) | Dusting post attrition (% loss) | Flow properties |
|---|---|---|---|---|---|
| TRONOX® CR-826 (agglomerated) | PHMS | 0.6% | 0.12 | 0.80 | 7.2 seconds |
| crenox ™ R-FK-2 (as is) | None | None | 0.65 | — | Significant bridging (no flow) |
| crenox ™ R-FK-2 (agglomerated) | PHMS | 0.6% | 0.08 | 0.12 | 5.5 seconds |

*The percent by weight of the treating agent based on the weight of the titanium dioxide particles.

The results of the above tests show that pigment agglomeration leads to reduction in dusting level and improvement in pigment flow properties.

Example II

Impact of Agglomeration of Rheological Properties

In this example, the following titanium dioxide pigments were tested:

(1) TRONOX® CR-834;

(2) an alumina based hydrophobic titanium dioxide manufactured by Tronox LLC in accordance with the chloride process and manufactured as TRONOX® CR-470;

(3) an alumina based hydrophobic titanium dioxide manufactured by Tronox LLC in accordance with the chloride process and marketed as TRONOX® 8400;

(4) TRONOX® CR-826; and (5) an alumina based hydrophilic titanium dioxide manufactured by crenox GmbH in accordance with the sulfate process and marketed as Crenox™ R-KB-3.

In each test, 200 grams of the titanium dioxide pigment sample being tested were placed in a one quart container and rolled on an Abbe Roller at 100 rpm for 1 hour. Each agglomerated pigment sample was then tested for rheological properties in accordance with the procedures described above. The results of the tests are shown in Table 2 below.

TABLE 2

| Experiment | High Load Torque (g-m) | Melt Flow index (g/10 min) | Screen Pack Pressure (psi) | Screen Pack Residue (ppm) |
|---|---|---|---|---|
| TRONOX® CR-834 (as is) | 1509 | 0.0 | 924 | 136 |
| TRONOX® CR-834 (agglomerated) | 1482 | 0.0 | 761 | 156 |
| TRONOX® CR-470 (as is) | 1322 | 0.0 | 818 | 107 |
| TRONOX® CR-470 (agglomerated) | 1323 | 0.0 | 769 | 103 |
| TRONOX® 8400 (as is) | 1240 | 0.0 | 698 | 68 |
| TRONOX® 8400 (agglomerated) | 1232 | 0.0 | 672 | 93 |
| TRONOX® CR-826 (as is) | 1797 | 0.0 | 1056 | 157 |
| TRONOX® CR-826 (agglomerated) | 1756 | 0.0 | 1456 | 317 |
| crenox ™ R-KB-3 (as is) | 1796 | 0.0 | 1105 | 187 |
| crenox ™ R-KB-3 (agglomerated) | 2051 | 0.0 | 1114 | 237 |

The results of the tests indicate that simply agglomerating the pigment samples does not improve the rheological properties of the samples. In fact, in some cases, agglomerating the pigment samples deteriorated the rheological properties of the samples.

Example III

Impact of Mode of Organic Addition on Rheological Properties

In this example, the following titanium dioxide pigments were tested:

(1) TRONOX® CR-834;

(2) TRONOX® CR-826; and (3) Crenox™ R-KB-3.

The hydrophobic, organic treating agent utilized in each test was PHMS.

In a first test procedure, 200 grams of each of the sample pigments were sprayed with 1.2 grams of PHMS. The samples were then transferred to a 1 quart container and rolled on an Abbe Roller at 100 rpm for 1 hour.

In a second test procedure, 1000 grams of each of the sample pigments were micronized with 6 grams PHMS in a steam injected micronizer.

In a third test procedure, 200 grams of each of the sample pigment were micronized with PHMS in a steam injected micronizer. The samples were then transferred to a 1 quart container and rolled on an Abbe Roller at 100 rpm for 16 hours.

The three starting pigment samples and the three pigment samples each from the first test procedure, second test procedure and third test procedure, respectively, were then tested for rheological properties according to the procedures described above. The results of the tests are shown in Table 3 below.

TABLE 3

| Experiment | High Load Torque (g-m) | Melt Flow Index (g/10 min) | Screen Pack Pressure (psi) | Screen Pack Residue (ppm) |
|---|---|---|---|---|
| TRONOX ® CR-834 (as is) | 1509 | 0.0 | 924 | 136 |
| TRONOX ® CR-834 Test Procedure 1 (formed into agglomerates with PHMS) | 1289 | 4.4 | 680 | 156 |
| TRONOX ® CR-834 Test procedure 2 (micronized with PHMS) | 1309 | 4.0 | 637 | 60 |
| TRONOX ® CR-834 Test procedure 3 (micronized with PHMS and then formed into agglomerates) | 1320 | 3.7 | 737 | 105 |
| TRONOX ® CR-826 (as is) | 1797 | 0.0 | 1056 | 157 |
| TRONOX ® CR-826 Test procedure 1 (formed into agglomerates with PHMS) | 1314 | 7.0 | 679 | 51 |
| TRONOX ® CR-826 Test procedure 2 (micronized with PHMS) | 1456 | 4.4 | 741 | 73 |
| TRONOX ® CR-826 ™ Test procedure 3 (micronized with PHMS and then formed into agglomerates) | 1464 | 4.6 | 754 | 53 |
| crenox ™ R-KB-3 (as is) | 1796 | 0.0 | 1105 | 187 |
| crenox ™ R-KB-3 Test procedure 1 (formed into agglomerates with PHMS) | 1320 | 5.9 | 808 | 77 |
| crenox ™ R-KB-3 Test procedure 2 (micronized with PHMS) | 1570 | 3.9 | 802 | 76 |
| crenox ™ R-KB-3 Test procedure 3 (micronized with PHMS and then formed into agglomerates) | 1557 | 3.7 | 802 | 71 |

The results of the tests show that adding the hydrophobic organic treating agent to the pigment sample during the agglomeration process provides the best improvement in rheological properties.

Example IV

Rotating Pan Mixer

Batch Process

Impact of Batch Size and Rotating Speed on Particles Size and Dusting Level

In this example, the titanium dioxide pigment tested was TRONOX® CR-834. The hydrophobic, organic treating agent utilized in the test was PHMS. In carrying out the test, a 1989 Pan Batch Mixer, Model #RV02 from Eirich Machines (an "Eirich Mixer") was used.

In three of the samples, 1500 grams of TRONOX® CR-834 was added to the Eirich Mixer. The pan rotational speed was set at 20 rpm, 40 rpm and 60 rpm, respectively. As the pigment started mixing in the Eirich Mixer, 9 grams of PHMS were sprayed onto the pigment.

In an additional three samples, 3000 grams of TRONOX® CR-834 was added to the Eirich Mixer. The pan rotational speed was set at 20 rpm, 40 rpm and 60 rpm, respectively. As the pigment started mixing in the Eirich Mixer, 18 grams of PHMS were sprayed onto the pigment.

A pigment sample that was not agglomerated and the six agglomerated samples were then tested for particle size via sieve analysis, and dusting properties according to the procedures described above. The samples were also subjected to attrition testing and re-tested for dusting analysis according to the procedure set forth above. The results of the tests are shown in Table 4 below.

TABLE 4

| Pigment | Batch Size (g) | Pan Rotational Speed (rpm) | Sieve analysis ($d_{50}$ in microns) | Dusting (% loss) | Dusting post attrition (% loss) |
|---|---|---|---|---|---|
| TRONOX ® CR-834 (as is) | — | — | — | 6.84 | — |
| TRONOX ® CR-834 (agglomerated) | 1500 | 20 | 400 | 0.44 | 1.24 |
| TRONOX ® CR-834 (agglomerated) | 1500 | 40 | 550 | 0.24 | 1.48 |
| TRONOX ® CR-834 (agglomerated) | 1500 | 60 | 760 | 1.32 | 1.28 |
| TRONOX ® CR-834 (agglomerated) | 3000 | 20 | 400 | 0.60 | 0.08 |
| TRONOX ® CR-834 (agglomerated) | 3000 | 40 | >850 | 1.52 | 0.36 |
| TRONOX ® CR-834 (agglomerated) | 3000 | 60 | >850 | 2.00 | 2.08 |

The results of the tests show that as the pigment batch size and/or the pan rotational speed are increased, the average particle size of the agglomerated pigment increases and the dusting characteristics of the pigment deteriorate. However, the dusting characteristics of the agglomerated pigment under all testing conditions were better than the pigment sample that was not agglomerated.

Example V

Rotating Pan Mixer

Continuous Process

Impact of Pan Angle, Pan Rotational Speed and Pigment Feed Rate on Particle Size and Dusting Level The titanium dioxide pigment utilized in these tests was TRONOX® CR-834. The hydrophobic organic treating agent was PHMS.

Seven different tests were carried out on the pigment in a Mars Mineral, Model P30 Disc Pelletizer ("Mars Mixer") to evaluate the impact of pan angle, pan rotational speed, and pigment feed rate on the particle size and dusting level. The conditions of each test are set forth in Table 5 below.

TABLE 5

| Experiment | Pigment Feed Rate (g/min) | Pan Angle (degrees)* | Pan Rotational Speed (rpm) |
|---|---|---|---|
| 1 | 3200 | 40 | 12.5 |
| 2 | 3200 | 50 | 12.5 |
| 3 | 3200 | 60 | 12.5 |
| 4 | 6700 | 50 | 12.5 |
| 5 | 6700 | 50 | 37.0 |
| 6 | 8000 | 50 | 12.5 |
| 7 | 10000 | 50 | 12.5 |

*The pan pelletizer was downwardly inclined at this angle with respect to the horizontal plane of the room in which the tests were carried out.

In each test, TRONOX® CR-834 was fed into the Mars Mixer using a Schenk Accurate Feeder. As TRONOX® CR-834 dropped into the Mars Mixer, PHMS was sprayed onto the pigment at a rate of 0.6% of TRONOX® CR-834 feed rate. In each test, the time to fill the Mars Mixer (residence time) was determined. The pigment agglomeration process was continued for 15 minutes after the pan was filled.

The resulting samples were tested for particle size distribution by sieve analysis, and dusting properties according to the procedures described above. The samples were then subjected to attrition and retested for dusting analysis according to the procedures described above. The results of the tests are set forth in Table 6 below.

TABLE 6

| Experiment | Pigment Feed Rate (g/min) | Pan Angle (degrees)* | Pan Rotational Speed (rpm) | Residence Time (mins) | Sieve analysis ($d_{50}$ in microns) | Dusting % loss | Dusting post attrition (% loss) |
|---|---|---|---|---|---|---|---|
| 1 | 3200 | 40 | 12.5 | 12.50 | >4750 | 0.00 | 0.08 |
| 2 | 3200 | 50 | 12.5 | 6.00 | 2560 | 0.00 | 0.19 |
| 3 | 3200 | 60 | 12.5 | 3.50 | 2120 | 0.00 | 0.28 |
| 4 | 6700 | 50 | 12.5 | 2.50 | 1740 | 0.36 | 0.44 |
| 5 | 6700 | 50 | 37.0 | 4.25 | >4750 | 0.00 | 0.12 |
| 6 | 8000 | 50 | 12.5 | 2.50 | 1515 | 0.24 | 0.68 |
| 7 | 10000 | 50 | 12.5 | 1.75 | 1380 | 0.36 | 1.08 |

*The pan pelletizer was downwardly inclined at this angle with respect to the horizontal plane of the room in which the tests were carried out.

The results of the tests show that the pigment agglomerate size increased as the pan angle decreased, the pan rotation speed increased, and the pigment feed rate decreased. The dusting level of the pelletized pigment in all cases was very low before and after attrition.

Example VI

Rotating Pan Mixer

Continuous Process

Impact of Organic and Pigment Agglomeration on Rheological Properties

The titanium dioxide pigment utilized in the tests was TRONOX® CR-834. The hydrophobic, organic treating agent was PHMS.

Four different tests were carried out on the titanium dioxide pigment to evaluate the impact of adding the organic treating agent thereto and agglomeration of pigment on the rheological properties of the pigment.

In the first test, the sample pigment was evaluated for rheological properties in accordance with the procedures described above.

In the second test, 6 grams of PHMS were added to 1000 grams of the sample pigment at the time the pigment was micronized, and the resulting sample was evaluated for rheological properties in accordance with the procedures set forth above.

In the third test, the sample pigment was fed into a Mars Mixer at a pigment feed rate of 16,500 grams per minute. The pan was downwardly inclined at an angle of 50 degrees with respect to the horizontal plane of the room in which the test was carried out, and the pan rotation speed was set at 10 rpm. In this test, the PHMS was not added to the pigment during the agglomeration process. The agglomerated pigment was then evaluated for rheological properties in accordance with the procedures described above.

In the fourth test, the pigment sample was fed into the Mars Mixer at a pigment feed rate of 16,500 grams per minute. The pan pelletizer was downwardly inclined at an angle of 50 degrees with respect to the horizontal plane of the room in which the test was carried out. The pan rotational speed was set at 10 rpm. As the pigment dropped into the Mars Mixer, the PHMS was added at a rate of 99 grams per minute. The agglomerated pigment sample was then evaluated for rheological properties as per the procedures described above. The pour and tap densities of the pigment utilized in each test along with the rheological properties are set forth in Table 7 below.

TABLE 7

| Experiment | Pour Density (g/cc) | Tap Density (g/cc) | High Load Torque (g-m) | Melt Flow Index (g/10 min) | Screen Pack Pressure (psi) | Screen Pack Residue (ppm) |
|---|---|---|---|---|---|---|
| TRONOX® CR-834 (as is) | 0.69 | 0.83 | 1745 | 0.0 | 909 | 163 |
| TRONOX® CR-834 (agglomerated without PHMS) | 0.85 | 1.06 | 1689 | 0.0 | 895 | 152 |
| TRONOX® CR-834 with polysiloxane (micronized with PHMS) | 0.42 | 0.74 | 1525 | 3.1 | 741 | 80 |
| TRONOX® CR-834 (agglomerated with PHMS) | 0.89 | 1.12 | 1115 | 5.3 | 767 | 47 |

The results of the test show that the addition of the hydrophobic organic treating agent along with agglomeration of the pigment contributed to the improvement of the rheological properties of the pigment.

Example VII

Impact of Mode of Organic Addition on Rheological Properties Using Different Types of Organics The titanium dioxide pigment utilized in these tests was TRONOX® CR-834. The following hydrophobic, organic treating agents were utilized in the tests:

(1) PHMS;
(2) poly(dimethylsiloxane) ("PDMS"); and
(3) n-octyl triethoxysilane ("OTES").

In a first set of tests, 1.2 grams PHMS, 1.0 grams of PDMS and 1.0 grams of the OTES were separately sprayed on 200 grams of the titanium dioxide pigment sample. The samples were then transferred to a 1 quart container and rolled on an Abbe Roller at 100 rpm for 1 hour.

In a second set of tests, 6 grams of PHMS, 5 grams of PDMS and 5 grams of OTES were each separately added to 1000 grams of the titanium dioxide pigment at the time the pigment was micronized. The resulting samples were not agglomerated.

In a third set of tests, 6 grams of PHMS, 5 grams of PDMS and 5 grams of OTES were each separately added to 1000 grams of the titanium dioxide pigment sample. Then, 200 grams of each of these resulting samples was transferred to a 1 quart container and rolled on an Abbe Roller at 100 rpm for 16 hours.

All 9 of the test samples and a sample of the pigment that was not agglomerated were then tested for rheological properties according to the procedures discussed above. The results of the tests are shown in Table 8 below.

TABLE 8

| Experiment | High Load Torque (g-m) | Melt Flow Index (g/10 min) | Screen Pack Pressure (psi) | Screen Pack Residue (ppm) |
|---|---|---|---|---|
| TRONOX ® CR-834 (as is) | 1482 | 0.0 | 899 | 171 |
| TRONOX ® CR-834 agglomerated with PHMS | 1289 | 4.4 | 680 | 156 |

TABLE 8-continued

| Experiment | High Load Torque (g-m) | Melt Flow Index (g/10 min) | Screen Pack Pressure (psi) | Screen Pack Residue (ppm) |
|---|---|---|---|---|
| TRONOX ® CR-834 micronized with PHMS | 1309 | 4.0 | 637 | 60 |
| TRONOX ® CR-834 micronized with PHMS and then agglomerated | 1320 | 3.7 | 737 | 105 |
| TRONOX ® CR-834 agglomerated with PDMS | 1336 | 4.0 | 673 | 71 |
| TRONOX ® CR-834 micronized with PDMS | 1392 | 3.0 | 679 | 83 |
| TRONOX ® CR-834 micronized with PDMS and then agglomerated | 1373 | 3.3 | 657 | 71 |
| TRONOX ® CR-834 agglomerated with OTES | 1263 | 5.3 | 564 | 59 |
| TRONOX ® CR-834 micronized with OTES | 1506 | 0 | 844 | 123 |
| TRONOX ® CR-834 micronized with OTES and then agglomerated | 1533 | 0 | 790 | 152 |

The results of the tests show that adding the hydrophobic, organic treating agent, regardless of the exact type of the treating agent, to the pigment during the agglomeration process provides the best improvement in rheological properties.

Thus, the present invention is well adapted to carry out the objects and attain the ends and advantages mentioned as well as those which are inherent therein.

What is claimed is:

1. A method of producing a titanium dioxide pigment, comprising:
   (1) producing titanium dioxide particles; and
   (2) forming said titanium dioxide particles into titanium dioxide agglomerates by a method that includes the following steps:
      (a) feeding said titanium dioxide particles into an agglomerator;
      (b) admixing a hydrophobic, organic treating agent with said titanium dioxide particles by spraying said treating agent on said titanium dioxide particles in said agglomerator; and
      (c) operating said agglomerator to form said titanium dioxide particles into titanium dioxide agglomerates.

2. The method of claim 1, wherein said titanium dioxide particles are produced by the chloride process.

3. The method of claim 1, wherein said titanium dioxide particles are produced by the sulfate process.

4. The method of claim 1, wherein said titanium dioxide particles are in the form of a powder having a primary particle size in the range of from about 0.1 microns to about 0.5 microns.

5. The method of claim 1, wherein prior to introducing said titanium dioxide particles into said agglomerator, said titanium dioxide particles are processed to remove lumps therefrom.

6. The method of claim 5, wherein said titanium dioxide particles are processed to remove lumps therefrom by conducting said particles through an upstream vibrating screen.

7. The method of claim 6, wherein said upstream vibrating screen has a U.S. mesh size in the range of from about 7 to about 16.

8. The method of claim 1, wherein said treating agent is selected from silanes, polysiloxanes, saturated fatty acid salts, unsaturated fatty acid salts, phosphonic acids and derivatives thereof, and mixtures thereof.

9. The method of claim 8, wherein said treating agent is selected from silanes, polysiloxanes, and mixtures thereof.

10. The method of claim 9, wherein said silanes are silanes having the formula:

where R is an alkyl group (including a functionalized alkyl group), an aryl group (including a functionalized aryl group), or an alkylaryl group (including a functionalized alkylaryl group);

X is a halogen, hydroxy or alkoxy group; and n is from 1 to 3.

11. The method of claim 10, wherein said silanes are selected from hexyltrichlorosilane, hexylmethyldichlorosilane, octyltrichlorosilane, octylmethyldichlorosilane, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyldiethoxysilane, octylmethyldiethoxysilane, aminopropyltrimethoxysilane, aminopropyl-triethoxysilane, and mixtures thereof.

12. The method of claim 9, wherein said polysiloxanes are polysiloxanes having the formula:

where $R_1$ and $R_2$ are a hydrogen, an alkyl group or an aryl group;

X is hydrogen or a hydroxyl group, alkoxy group, alkyl group (including functionalized alkyl groups), or aryl group (including functionalized aryl groups);

Y is a hydrogen or an alkyl group (including functionalized alkyl groups), or an aryl group (including functionalized aryl groups); and n is from 1 to 2000.

13. The method of claim 12, wherein said polysiloxanes are selected from polyhydrogenmethylsiloxane, polydimethylsiloxane, polyalkylsiloxanes where the alkyl group can range from $C_1$ to $C_{18}$ or higher, polyphenylmethylsiloxane, polydiphenylsiloxane, and mixtures thereof.

14. The method of claim 9, wherein said treating agent is selected from n-octyl triethoxysilane, poly(hydrogenmethylsiloxane), poly(dimethylsiloxane), and mixtures thereof.

15. The method of claim 14, wherein said treating agent is poly(hydrogen-methylsiloxane).

16. The method of claim 1, wherein said treating agent is admixed with said titanium dioxide particles in said agglomerator in an amount in the range of from about 0.1% by weight to about 2.0% by weight, based on the weight of said titanium dioxide particles.

17. The method of claim 1, wherein said treating agent is sprayed on said titanium dioxide particles in the form of a liquid spray having a mean droplet size of no greater than 100 microns.

18. The method of claim 1, wherein said agglomerator is a rotary mixer.

19. The method of claim 18, wherein said rotary mixer is a pan pelletizer.

20. The method of claim 19, wherein said pan pelletizer is downwardly inclined at an angle with respect the horizontal plane.

21. The method of claim 1, wherein said titanium dioxide agglomerates are transferred from said agglomerator to a downstream vibrating screen.

22. The method of claim 21, wherein said downstream vibrating screen has a U.S. mesh size in the range of from about 2 to about 10.

23. The method of claim 1, wherein said titanium dioxide agglomerates have an average agglomerate size in the range of from about 200 microns to about 800 microns.

24. The method of claim 1, wherein said method is carried out on a continuous basis.

25. A method of producing a titanium dioxide pigment on a continuous basis, comprising:
   (1) producing titanium dioxide particles by the chloride or sulfate process; and
   (2) forming said titanium dioxide particles into titanium dioxide agglomerates by a method that includes the following steps:
      (a) feeding said titanium dioxide particles into a rotary mixer;
      (b) admixing a hydrophobic, organic treating agent with said titanium dioxide particles by spraying said treating agent on said titanium dioxide particles in said agglomerator, wherein said treating agent is selected from silanes and polysiloxanes; and
      (c) operating said rotary mixer to form said titanium dioxide particles into titanium dioxide agglomerates.

26. The method of claim 25, wherein prior to introducing said titanium dioxide particles into said rotary mixer, said titanium dioxide particles are processed to remove lumps therefrom.

27. The method of claim 25, wherein said treating agent is selected from silanes, polysiloxanes, saturated fatty acid salts, unsaturated fatty acid salts, phosphonic acids and derivatives thereof, and mixtures thereof.

28. The method of claim 27, wherein said treating agent is selected from silanes, polysiloxanes, and mixtures thereof.

29. The method of claim 28, wherein said treating agent is selected from n-octyl triethoxysilane, poly(hydrogenmethylsiloxane), poly(dimethylsiloxane), and mixtures thereof.

30. The method of claim 29, wherein said treating agent is poly(hydrogen-methylsiloxane).

31. The method of claim 25, wherein said treating agent is admixed with said titanium dioxide particles in said rotary mixer in an amount in the range of from about 0.1% by weight to about 2.0% by weight, based on the weight of said titanium dioxide particles.

32. A method of improving the processability of titanium dioxide pigment particles without adversely affecting the rheological properties of the titanium dioxide pigment, comprising:
   (a) feeding said titanium dioxide particles into an agglomerator;
   (b) admixing a hydrophobic, organic treating agent with said titanium dioxide particles by spraying said treating agent on said titanium dioxide particles in said agglomerator;
   (c) operating said agglomerator to form said titanium dioxide particles into titanium dioxide agglomerates; and
   (d) transferring said titanium dioxide agglomerates out of said agglomerator.

33. The method of claim 32, wherein prior to introducing said titanium dioxide particles into said agglomerator, said titanium dioxide particles are processed to remove lumps therefrom.

34. The method of claim 33, wherein said titanium dioxide particles are processed to remove lumps therefrom by conducting said particles through an upstream vibrating screen having a U.S. mesh size in the range of from about 7 to about 16.

35. The method of claim 32, wherein said treating agent is selected from silanes, polysiloxanes, saturated fatty acid salts, unsaturated fatty acid salts, phosphonic acids and derivatives thereof, and mixtures thereof.

36. The method of claim 35, wherein said treating agent is selected from silanes, polysiloxanes, and mixtures thereof.

37. The method of claim 36, wherein said silanes are silanes having the formula:

where R is an alkyl group (including a functionalized alkyl group), an aryl group (including a functionalized aryl group), or an alkylaryl group (including a functionalized alkylaryl group);

X is a halogen, hydroxy or alkoxy group; and n is from 1 to 3.

38. The method of claim 37, wherein said silanes are selected from hexyltrichlorosilane, hexylmethyldichlorosilane, octyltrichlorosilane, octylmethyldichlorosilane, propyltrimethoxysilane, hexyltrimethoxysilane, octyltrimethoxysilane, hexyltriethoxysilane, octyltriethoxysilane, hexylmethyldimethoxysilane, octylmethyldimethoxysilane, hexylmethyl-diethoxysilane, octylmethyldiethoxysilane, aminopropyltrimethoxysilane, aminopropyltriethoxy-silane, and mixtures thereof.

39. The method of claim 36, wherein said polysiloxanes are polysiloxanes having the formula:

where $R_1$ and $R_2$ are a hydrogen, an alkyl group or an aryl group;

X is hydrogen or a hydroxyl group, alkoxy group, alkyl group (including functionalized alkyl groups), or aryl group (including functionalized aryl groups);

Y is a hydrogen or an alkyl group (including functionalized alkyl groups), or an aryl group (including functionalized aryl groups); and n is from 1 to 2000.

40. The method of claim 39, wherein said polysiloxanes are selected from polyhydrogenmethylsiloxane, polydimethylsiloxane, polyalkylsiloxanes where the alkyl group can range from $C_1$ to $C_{18}$ or higher, polyphenylmethylsiloxane, polydiphenylsiloxane, and mixtures thereof.

41. The method of claim 36, wherein said treating agent is selected from n-octyl triethoxysilane, poly(hydrogenmethylsiloxane), poly(dimethylsiloxane), and mixtures thereof.

42. The method of claim 41, wherein said treating agent is poly(hydrogen-methylsiloxane).

43. The method of claim 32, wherein said treating agent is admixed with said titanium dioxide particles in said agglomerator in an amount in the range of from about 0.1% by weight to about 2.0% by weight, based on the weight of said titanium dioxide particles.

44. The method of claim 32, wherein said treating agent is sprayed on said titanium dioxide particles in the form of a liquid spray having a mean droplet size of no greater than 100 microns.

45. The method of claim 32, wherein said agglomerator is a rotary mixer.

46. The method of claim 45, wherein said rotary mixer is a pan pelletizer.

47. The method of claim 32, wherein said method is carried out on a continuous basis.

* * * * *